United States Patent [19]

Mager et al.

[11] 4,062,189

[45] Dec. 13, 1977

[54] METHOD OF PREVENTING THE ACCUMULATION OF MICRO-ORGANISMS IN THERMAL ENERGY CONVERSION SYSTEMS

[75] Inventors: David Mager, New York, N.Y.; William E. Heronemus, Amherst, Mass.; Peter M. J. Woodhead, Setauket, N.Y.

[73] Assignee: Pacific Power and Protein, Inc., New York, N.Y.

[21] Appl. No.: 727,680

[22] Filed: Sept. 29, 1976

[51] Int. Cl.² .................................................. F03G 7/04
[52] U.S. Cl. ........................................ 60/641; 165/97; 165/105; 60/646; 60/657
[58] Field of Search .................... 165/97, 105; 60/641, 60/646, 657

[56] References Cited

U.S. PATENT DOCUMENTS

| | | | |
|---|---|---|---|
| 1,493,368 | 5/1924 | Merz | 60/641 |
| 2,006,985 | 7/1935 | Claude | 60/641 X |
| 2,637,531 | 5/1953 | Davidson | 165/97 X |
| 3,312,054 | 4/1967 | Anderson | 60/531 |
| 3,896,622 | 7/1975 | Daniello | 60/641 |
| 3,975,912 | 8/1976 | Green | 60/641 |

Primary Examiner—Allen M. Ostrager
Attorney, Agent, or Firm—Kenyon & Kenyon, Reilly, Carr & Chapin

[57] ABSTRACT

In an ocean thermal energy conversion system utilizing solar energy stored as heat in tropical waters to generate electricity, the evaporating and condensing functions of the heat exchangers are interchanged in order to prevent the accumulation of micro-organisms on their surfaces. The surfaces of the heat exchangers are also mechanically brushed or scraped so as to remove any thin films of microbial slime. In order to remove additional micro-organisms from the surfaces of the heat exchangers, the flow of hot and cold sea water through each of the heat exchangers is interchanged preferably on a daily basis. Thus, micro-organisms from the warm surface waters that attach themselves to one heat exchanger surface will be destroyed by the cold water that flows through that heat exchanger on the next day. On the other hand, the organisms that live in the cold water at great depths cannot survive the next day's warm water environment which is caused by alternating the flow to the two heat exchangers.

12 Claims, 7 Drawing Figures

METHOD OF PREVENTING THE ACCUMULATION OF MICRO-ORGANISMS IN THERMAL ENERGY CONVERSION SYSTEMS

BACKGROUND OF THE INVENTION

This invention relates generally to ocean thermal energy conversion systems and more particularly to one wherein the water pumped into the heat exchangers is alternated so as to prevent the accumulation of micro-organisms on the surface thereof.

Ocean thermal energy conversion systems have heretofore been proposed and utilize solar energy stored in tropical waters in order to generate electricity. In such systems, heat exchangers are provided and a suitable working fluid such as ammonia is evaporated in one of the heat exchangers by using the relatively warm surface sea water as the heating medium. The evaporated ammonia is used to drive a turbine generator which produces the desired power. The ammonia exhausted from the turbine generator is condensed in the second heat exchanger by using relatively cold deep sea water as the cooling medium. The condensed liquid ammonia is then pumped to the first heat exchanger and the cycle is repeated.

Although such an ocean thermal energy conversion system is highly desirable, its application has been limited. A major limiting factor in utilizing such a system has long been identified by the fact that the required heat exchanger surfaces in contact with the sea water will gradually accumulate fouling. This in the first instance is recognized as microbial slime which will gradually increase to an accumulation of larger and larger marine flora and fauna. Although the organisms are different, they can be expected to accumulate to some degree with either warm or cold sea water. This problem is further accentuated in the types of systems with which the invention is concerned because of the great quantity of sea water passed through the heat exchangers.

Although numerous attempts have been directed at providing an efficient and workable thermal energy convertor, these attempts have met with varying degrees of success primarily because of the problems associated with the accumulation of micro-organisms on the heat exchanger surfaces. By the means disclosed herein, such a thermal energy conversion system may be operated without the concomitant accumulation of micro-organisms on the heat exchanger surfaces which have previously reduced the efficiency and ultimately effected the operation of the system.

SUMMARY OF THE INVENTION

Briefly stated, the invention disclosed herein provides a method of preventing the accummulation of micro-organisms on the surfaces of the heat exchangers utilized in a thermal energy conversion system. The warm surface sea water is routed through a first heat exchanger in order to evaporate the working fluid contained therein. The working fluid vapor is used to drive the turbine generator with the exhausted vapor being routed to a second heat exchanger. Cold deep sea water is passed through the second heat exchanger in order to condense the evaporated working fluid from the turbine generator. The functions of the heat exchangers are then reversed such that the warm surface sea water flows to the second heat exchanger which then functions as an evaporator rather than a condensor as was the case prior to reversal of the fluid flow. The turbine generator is driven with the working fluid vapor from the second heat exchanger. The vapor from the turbine generator is routed to the first heat exchanger which now functions as a condensor because of the cold deep sea water being passed therethrough. This interchanging of the cooling and heating mediums in the heat exchangers prevents the accumulation of micro-organisms on the heat exchanger surfaces because of the nature of these organisms. More specifically, the micro-organisms from the warm surface waters that attach themselves to the heat exchanger surface during one phase of the operation are destroyed by the cold water that flows through that particular heat exchanger after a reversal of the fluid flows. Similarly, the organisms that live in the cold water at great depths cannot survive the warm water environment. As a result, the incipient microbial fouling that develops during operation in one particular mode is destroyed by operation in the other mode.

In one of the embodiments of the invention, the reversal of the cooling and heating mediums flowing from the heat exchangers is accomplished preferably on a daily basis to eliminate the accumulation of micro-organisms. Further, the working fluid utilized to drive the turbine generator is preferably ammonia although other suitable fluids such as propane, isobutane or the like may be substituted. The turbine generator is of a configuration capable of being rotated 180° with the inlet and outlet ducts of the turbine generator being reversed and attachable to the appropriate heat exchangers. In addition to the reversal of the fluid flow through the heat exchangers, it is desirable to include the step of mechanical brushing or scraping of the heat exchanger surfaces which are relatively smooth and flat so that even the thinnest films of microbial slime are eliminated.

In a more specific embodiment of the invention, a plurality of heat exchangers, preferably four, and a plurality of turbine generators, preferably two, are provided. Each of the turbine generators is coupled to alternate heat exchangers. During one phase of operation, cold water is introduced into adjacent heat exchangers while hot water is introduced into the other pair of heat exchangers. In each of these modes of operation, one pair of adjacent heat exchangers are operating as condensers while the others are operated as evaporators. In order to prevent the accumulation of micro-organisms on the heat exchanger surfaces, the flow of the heating and cooling mediums is reversed such that those heat exchangers operating as evaporators in one mode will operate as condensers in the other mode while conversely those heat exchangers operating as condensers in the one mode will then operate as evaporators in the other mode.

A rapid change over from one operating mode to the other is accomplished by means of a floating conduit which is capable of being moved and connected to each of the respective heat exchangers. In the first mode, the floating conduit is coupled to the first pair of heat exchangers while in the second operating mode it is coupled to the last pair of heat exchangers. In the intermediate or change over mode, the conduit is coupled to the middle two heat exchangers. Thus, in the second operating mode, each of the turbine generators has its operation reversed from that of the first operating mode.

By utilizing the disclosed system and mechanically scraping or brushing the flat heat exchanger surfaces on a daily basis and similarly reversing the fluid flow from the heat exchangers on preferably a daily basis, the accumulation of micro-organisms on the surface of the heat exchangers is eliminated. Thus, an efficient thermal energy conversion system is provided which is free of the accumulation of micro-organisms on the heat exchanger surfaces.

Accordingly, it is an object of this invention to provide an effective thermal energy conversion system in which the accumulation of micro-organisms on heat exchanger surfaces is eliminated.

It is another object of this invention to provide a thermal energy conversion system wherein the flow of the heating and cooling mediums to the heat exchangers is reversed on a periodic basis.

It is still another object of this invention to provide an ocean thermal energy conversion system wherein the functions of the respective heat exchangers are interchanged on a periodic basis in order to eliminate the accumulation of micro-organisms on the heat exchanger surfaces.

These and other objects, advantages and features of the invention will become more apparent from the following description taken in conjunction with the accompanying drawings.

DESCRIPTION OF THE PREFERRED EMBODIMENT

Figure 1:
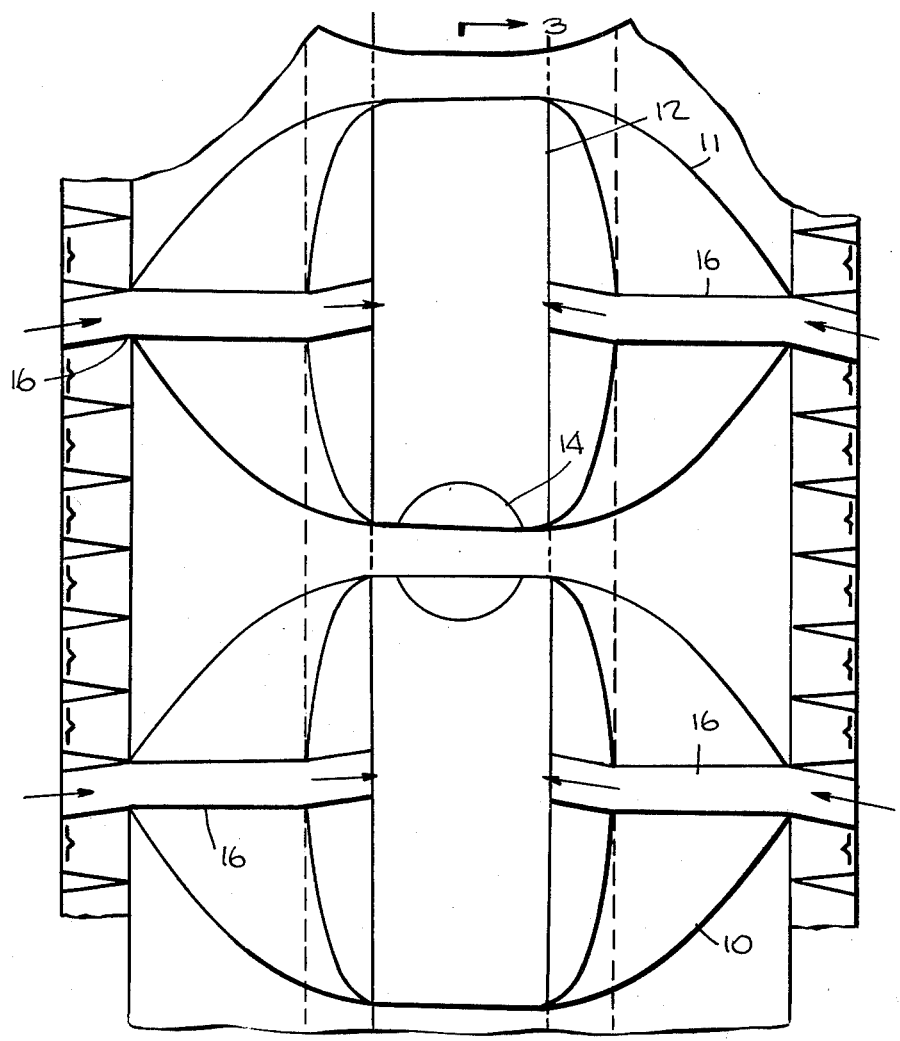
FIG. 1 is a plan view of the ocean thermal energy conversion system of this invention.
Figure 2:
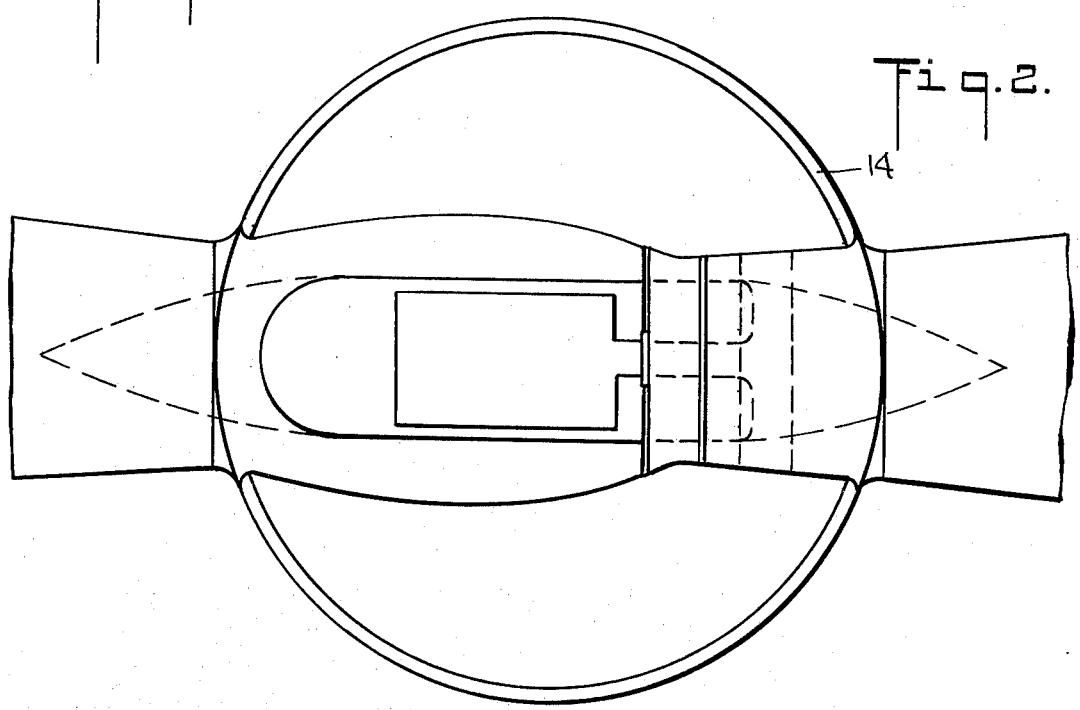
FIG. 2 is an enlarged plan view of the rotatable turbine generator employed in the ocean thermal energy conversion system of this invention.

With reference to the drawings, the thermal energy conversion system of this invention is arranged on an ocean going vessel in the embodiment of FIGS. 1–4 and includes a pair of heat exchangers 10 and 11 disposed adjacent one another. Along the midships line is provided a hot water compartment 12 and directly beneath it, a cold water compartment 13. Intermediate the pair of heat exchangers 10 and 11 is positioned a rotatable turbine generator 14 which will be more fully described hereinafter.

The heat exchangers are preferably of a type developed by the University of Massachussetts under a grant GI-34979 from the National Science Foundation, Research Applied to National Needs (RANN), Washington, D.C. and described in a report entitled "Detailed Analytical Model of Rankine Cycle and Heat Exchangers for Ocean Thermal Difference Power Plants" (Report NSF/RANN/SE/GI-34979/TR/75/7) and dated July 1975, although other suitable heat exchangers might be substituted. The University of Massachussetts heat exchanger is a high flow, low temperature differential type with a pressure-proof-plate-fin configuration such that the surfaces over which the sea water flows are essentially smooth and flat. Such surfaces are thus capable of being brushed or scraped continuously when the system is in operation. The basic geometry of the heat exchanger is that of a very large number of plate-fin panels, wherein the fins form passages within or in between two parallel plates. The passages created by the fins and plates are relatively small. This geometry augments or extends the heat transfer surface on the inside of the heat exchanger, i.e. that side with which the working fluid will be in contact. Thus, the medium or fluid from which heat is being removed for evaporation, or into which heat is being rejected for condensation, flows across the flat smooth surface of the plate.

In any event, the heat exchangers are to be of such a size, configuration and arrangement so that they will serve equally well in the evaporator role and in the condenser role. Preferably, there should be some accommodation in the heat exchanger selection so that the capability for unit operation in the evaporator role will be about 1.3 times as large as that required of same heat exchanger for unit operation in the condenser role.

A working fluid such as ammonia is evaporated by the heat exchanger and used to drive the turbine generator 14. Ammonia is preferred because of economic factors although other suitable working fluids such as propane, freon or isobutane may also be used. In the mode of operation illustrated in FIG. 3, the heat exchanger 11 functions as an evaporator. Sliding gate 15 is open in this mode of operation and allows hot water to flow to the heat exchanger 11 in the direction indicated in FIG. 3. The hot water supply is obtained from the surface sea water and introduced into the hot water compartment 12 via the conduits 16. The other heat exchanger 10 functions as a condenser with the cold water flowing through the sliding gate 17 which is in the open position and the fluid flow being in the direction illustrated in FIG. 3.

The cold water supply is obtained from the deep ocean and is preferred to have a temperature within the range of 39° F. to 46° F. Sea water at this temperature may be obtained at a depth of approximately 1500 feet or deeper in tropical waters. The warm surface sea water on the other hand is preferred to have a temperature in the range of 70° to 90° F. In any event, a temperature differential between the warm surface sea water and the cold deep sea water is preferred to be between 30° to 45° F. in order to minimize the number and length of heat exchanges required.

Figure 3:
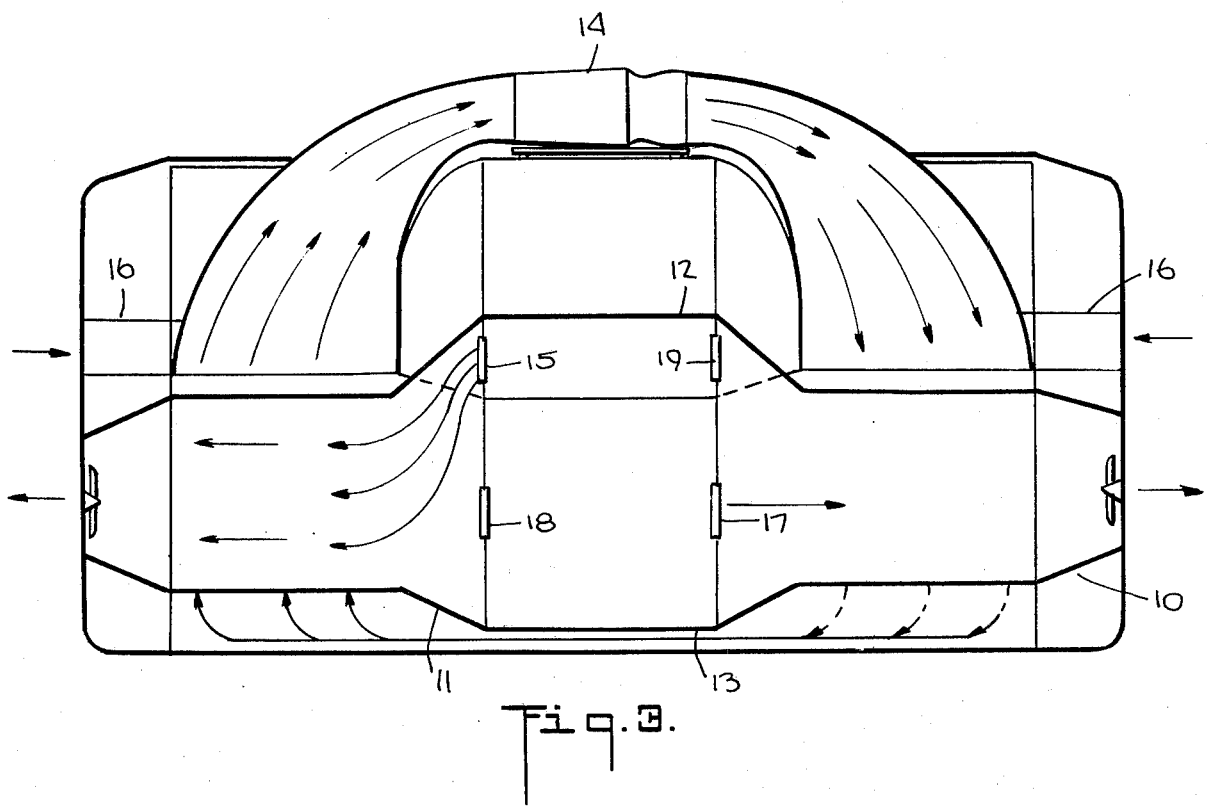
FIG. 3 is a side elevation view of the ocean thermal energy conversion system taken along the line 3—3 of FIG. 1 and operating in a first mode in accordance with this invention.

Referring again to the operating mode illustrated in the FIG. 3, the ammonia working fluid is evaporated in heat exchanger 11 with the vapor moving upward, passing through and driving through the turbine generator 14. The exhausted ammonia vapor is then routed to the heat exchanger 10 and condensed therein, heat exchanger 10 using the cold deep sea water as a cooling medium. The liquid ammonia is then pumped from heat exchanger 10 back to heat exchanger 11 and the cycle is repeated.

During this operating mode, the smooth flat surfaces of the heat exchangers are mechanically brushed or scrapped during operation. This brushing or scraping is provided to remove even the thinnest films of microbial slime which usually form the first layer of any microbial fouling caused by ocean water. By means of the mechanical brushing, the first layer of microbial slime is thus removed. However, despite the mechanical brushing, certain organisms will still attach to the heat exchanger surface. In order to eliminate this accumulation, the mode of operation of the heat exchangers is reversed. Thus, for instance with respect to heat exchanger 10 when operated in the mode illustrated in FIG. 3, organisms which survive only in relatively cold sea water will attach themselves to the sea water sides of this heat exchanger which functions as a condenser. However, once that heat exchanger has been changed from the condensing mode to the evaporating mode, and the cold water has been replaced by a flow of relatively warm water, any attached cold water organisms will die, fall into the sea water stream and be flushed out of the power plant. On the other hand, any fouling organisms that come from the flowing hot water and attach themselves to the sea water sides of the evaporating heat exchanger 11 of FIG. 3, despite the mechanical brushing, will be organisms that can survive only in relatively warm sea water. Once heat exchanger 11 has been changed from the evaporating mode to the condensing mode, and the warm sea water has been replaced by a flow of relatively cold water, any attached warm water organisms will die, fall into the stream and be flushed out of the power plant.

In reversing the flow of the heat exchangers 10 and 11, it is also necessary to rotate the turbine generator 14. This is accomplished by rotating the turbine generator 14 through 180° such that the exhaust and inlet ducts are interchanged and coupled with the heat exchangers 10 and 11 as illustrated in FIG. 4.

Figure 4:
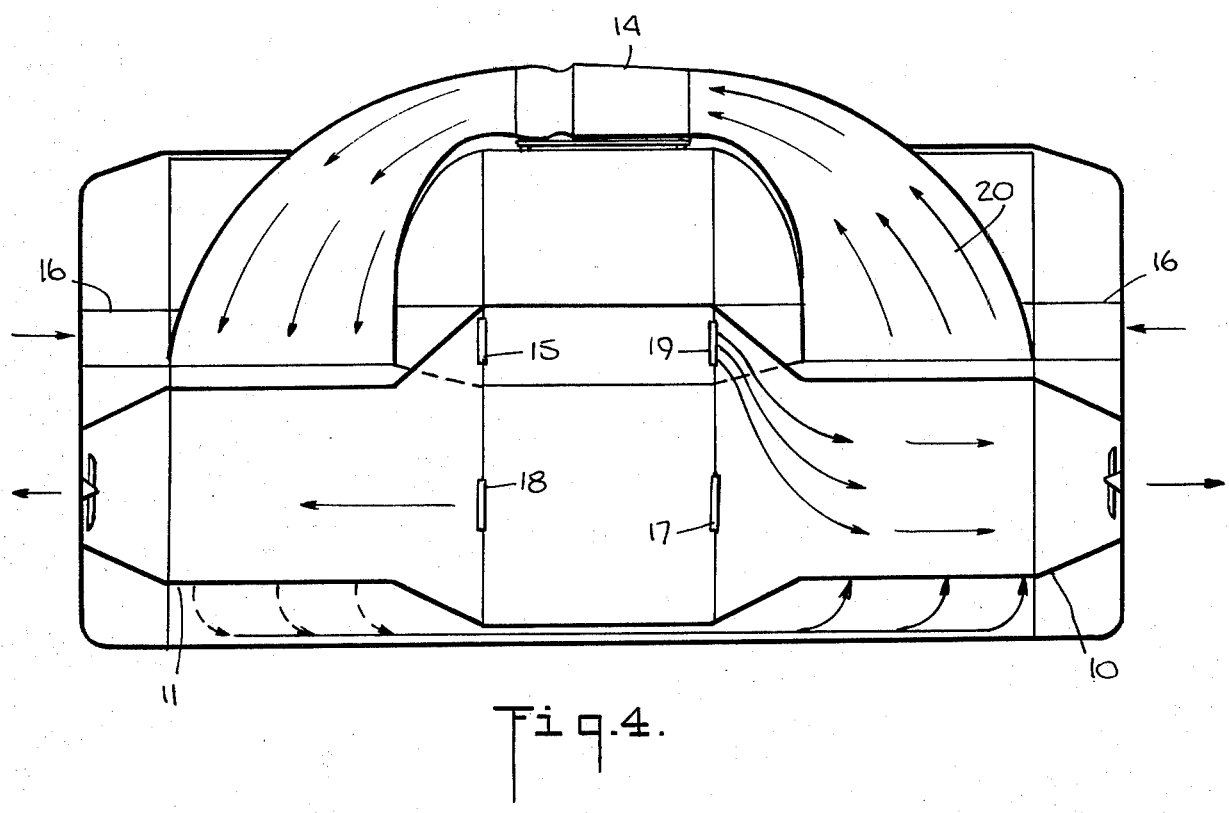
FIG. 4 is a side elevation view similar to that of FIG. 3 with the system operating in a second mode in accordance with this invention.

In the operating mode of FIG. 4, heat exchanger 11 now functions as a condenser with cold water being fed through the open sliding gate 18, sliding gate 17 now being in the closed position. Heat exchanger 10 receives the hot water flowing through the open gate 19, gate 15 being closed, and thus operates as an evaporator. The ammonia working fluid flows from the turbine generator 14 in the direction indicated by the arrows 20 which is the reverse of that in FIG. 3.

It is preferred that the direction of flow be reversed on a periodic basis in order to prevent any accumulation of micro-organisms. This flow reversal is preferably accomplished on a daily basis and by employing the system herein disclosed, such a change over may be accomplished in a time span of the order of 30 minutes.

Figure 7:
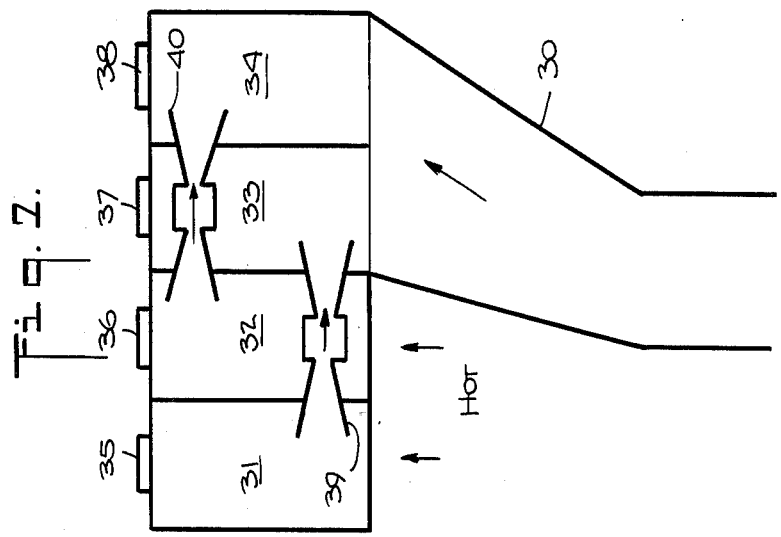
FIG. 7 is a diagramatic view of such other embodiment operating in a second mode.
Figure 5:
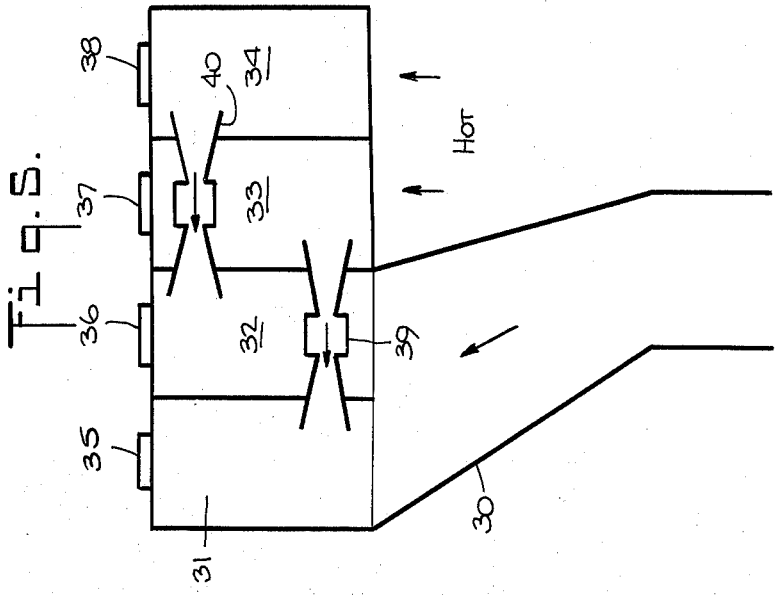
FIG. 5 is a diagramatic view of another embodiment of the energy conversion system of this invention operating in a first mode.

The embodiment of FIGS. 5 and 7 is intended to be used as a land based installation such as one employed on a tropical atoll, although its principles may be adapted to other installations. In this configuration, a floating conduit 30 is disposed with one end adapted to be coupled to the heat exchangers and the other end extending approximately 500 meters deep such that it will provide a supply of cold water. In this embodiment, there are four heat exchangers 31, 32, 33 and 34 disposed adjacent one another and each having associated pumps 35, 36, 37 and 38. A pair of turbine generators 39 and 40 of the type previously described are utilized. Turbine generator 39 is connected to heat exchangers 31 and 33 while turbine generator 40 is connected to heat exchangers 32 and 34.

In the mode of operation illustrated in FIG. 5, the heat exchangers 31 and 32 function as condensers while heat exchangers 33 and 34 are provided with a heating medium and function as evaporators. In this respect, heat exchanger 33 evaporates the ammonia working fluid which drives the turbine generator 39. The ammonia vapor is then routed to the condenser 31 with the condensed liquid being pumped by pump 35 and returned to the heat exchanger 33. Similarly, heat exchanger 34 functions in the evaporating mode with the vapor driving turbine generator 40. The vapor then flows to the condenser 32 with the condensed liquid being pumped by means of pump 36 back to the evaporating heat exchanger 34.

Figure 6:
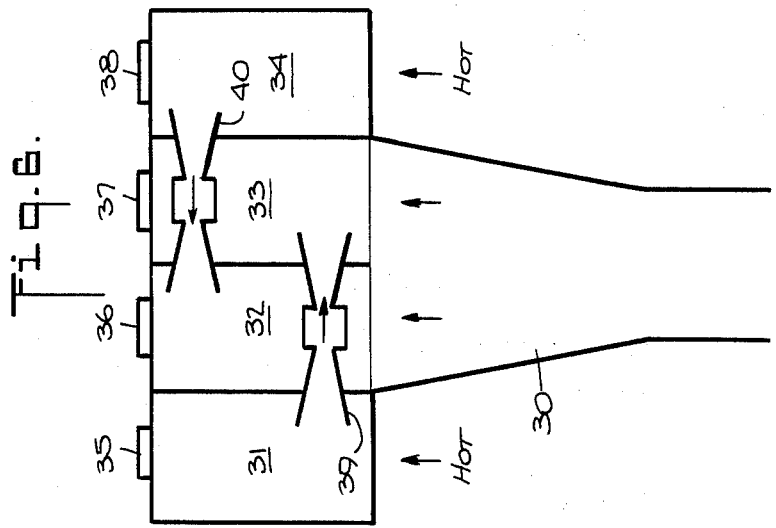
FIG. 6 is a diagramatic view of such other embodiment operating in an intermediate mode.

In order to prevent microbial fouling at the heat exchanger surfaces, as previously described the function of each heat exchanger is changed preferably on a daily basis. In order to accomplish this reversal of flow, an intermediate operating mode is provided such as depicted in FIG. 6 where the floating cold water conduit 30 has been moved such that it is connected to heat exchangers 32 and 33. In this mode of operation, the heat exchangers 32 and 34 and turbine generator 40 are operating in the same manner as previously described. However, turbine generator 39 has been rotated 180° since the heat exchanger 31 is now functioning as an evaporator and heat exchanger 33 now functions as a condenser. Thus, the ammonia working fluid is evaporated by heat exchanger 31 and drives turbine generator 39 with the exhausted vapor being routed to the condensing heat exchanger 33. The condensed vapor is then pumped by means of pump 37 back to the evaporating heat exchanger 31 and the cycle is repeated.

Operation in this intermediate mode is preferably conducted for a period of approximately 30 minutes. After such a period of operation, the system is converted to the mode illustrated in FIG. 7. There the cold water conduit 30 is moved such that it is engaged with heat exchangers 33 and 34. The system now functions in a mode the opposite of that of FIG. 5. In other words, heat exchangers 31 and 32 now operate as evaporators while heat exchangers 33 and 34 function as condensers. Also, turbine generator 40 is rotated 180° from that in the initial and intermediate modes. Heat exchangers 31 and 33 and turbine generator 39 operate in the same manner as described with respect to FIG. 6. As to the remaining system, heat exchanger 32 evaporates the ammonia working fluid and drives turbine generator 40 with the exhausted vapor being routed to heat exchanger 34. The cold water medium is introduced into heat exchanger 34 via the conduit 30 and condenses the vapor which is then pumped by means of the pump 38 back to the heat exchanger 32 and the cycle is repeated.

As in the case with the previously described embodiment, the fluid flow from the heat exchangers is preferably reversed on a daily basis. This period may however be extended depending upon the degree of fouling encountered in a particular system. For instance, in some instances where a minimum amount of fouling occurs, reversal need not take place for up to a 30 day period. In any event, by employing the means disclosed herein, a system is provided in which fouling of the heat exchanger surfaces is for all practical purposes eliminated and the system may be operated efficiently on a continuous basis.

Although the above description is directed to a preferred embodiment of the invention, it is noted that other variations and modifications will be apparent to those skilled in the art and, therefore, may be made without departing from the spirit and scope of the present invention.

What is claimed is:

1. A method of preventing the accumulation of micro-organisms on the surface of a heat exchanger in a thermal energy converting system which comprises:
   a. flowing warm surface sea water through a first heat exchanger to evaporate a working fluid contained therein;
   b. driving a turbine generator with the evaporated working fluid from said first heat exchanger;
   c. flowing the working fluid vapor from said turbine generator to a second heat exchanger;
   d. flowing cold sea water to a second heat exchanger to condense the working fluid vapor; and
   e. reversing the flow of sea water through said heat exchangers such that warm surface sea water is routed to said second heat exchanger to evaporate the working fluid contained therein and cold sea water is routed to said first heat exchanger to condense the working fluid vapor therein while the flow of the working fluid vapor through said turbine generator is from said second heat exchanger and the vapor discharged from said turbine generator is routed to said first heat exchanger whereby the accumulation of micro-organisms on the heat exchanger surface is prevented.

2. A method in accordance with claim 1 wherein said step of reversing the flow of the warm and cold sea water is conducted on approximately a daily basis.

3. A method in accordance with claim 1 wherein said working fluid is ammonia.

4. A method in accordance with claim 1 which further comprises the step of rotating the turbine generator 180° during said step of reversing the flow such that the inlet and outlet ducts of said turbine generator are interchanged with respect to said first and second heat exchangers.

5. A method in accordance with claim 1 wherein the temperature differential between said warm sea water and said cold sea water is in the range of approximately 30° to 45° F.

6. A method in accordance with claim 1 which further includes the step of brushing the surface of said heat exchangers periodically.

7. A method of preventing the accumulation of micro-organisms on the surface of a heat exchanger in a thermal energy converting system having at least four heat exchangers and a pair of turbine generators which comprises the steps of:
   a. positioning a first turbine generator in communication with the first and third heat exchangers and a second turbine generator in communication with the second and fourth heat exchangers;
   b. directing warm surface sea water to said third and fourth heat exchanger to evaporate a working fluid therein;
   c. driving said first and second turbine generators with the evaporated working fluid from said third and fourth heat exchanger to evaporate a working fluid therein;
   d. flowing the working fluid vapor from said first and second turbine generators to said first and second heat exchangers;
   e. flowing cold sea water through a movable conduit to said first and second heat exchangers to condense the working fluid vapor;
   f. moving the flow of sea water through said heat exchangers such that warm surface sea water is routed to said first and fourth heat exchangers to evaporate the working fluid contained therein and cold sea water is routed to said second and third heat exchangers to condense the working fluid vapor therein while the flow of working fluid vapor through said first turbine generator is from said first heat exchanger and the vapor discharged from said first turbine generator is routed to said third heat exchanger; and
   g. moving the flow of sea water through said heat exchangers to reverse the system flow from that set forth in steps (b) through (e) such that warm surface sea water is routed to said first and second heat exchangers to evaporate the working fluid contained therein and cold sea water is routed to said third and fourth heat exchangers to condense the working fluid vapor therein while the flow of working fluid vapor through said second turbine generator is from said second heat exchanger and the vapor discharged from said second turbine generator is routed to said fourth heat exchanger whereby the accumulation of micro-organisms on the heat exchanger surface is prevented.

8. A method in accordance with claim 7 wherein said steps (f) and (g) are conducted on approximately a daily basis.

9. A method in accordance with claim 7 wherein said working fluid is ammonia.

10. A method in accordance with claim 7 which further comprises the step of rotating said first turbine generator 180° during step (f) and said second turbine generator during said step (g) such that their inlet and outlet ducts are interchanged with respect to the respective heat exchangers.

11. A method in accordance with claim 7 wherein the temperature differential between said warm sea water and said cold sea water is in the range of approximately 30° to 45° F.

12. A method in accordance with claim 7 which further includes the step of brushing the surface of said heat exchangers periodically.

* * * * *